2 Sheets—Sheet 2.
J. ENRIGHT.
Pipe Coupling or Joint.
No. 210,414. Patented Dec. 3, 1878.
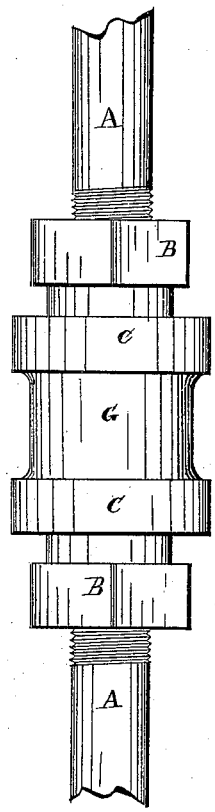
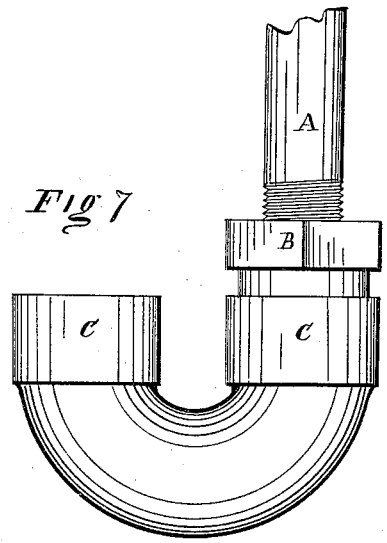
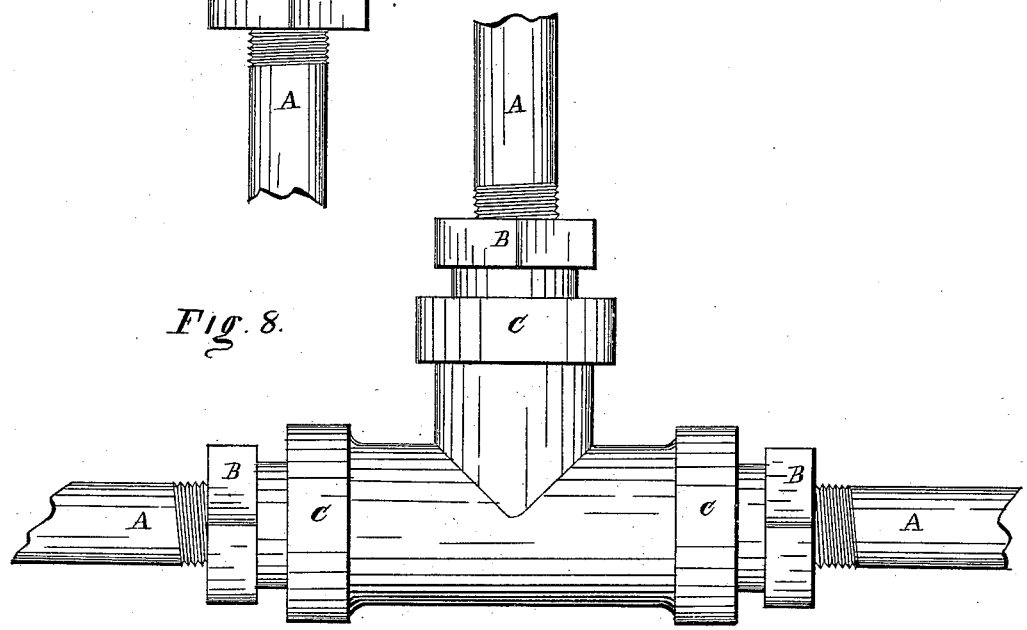
Witnesses. Inventor.
John Enright
per B. Burridge & Co.
Attys
N. PETERS, PHOTO-LITHOGRAPHER, WASHINGTON, D. C.

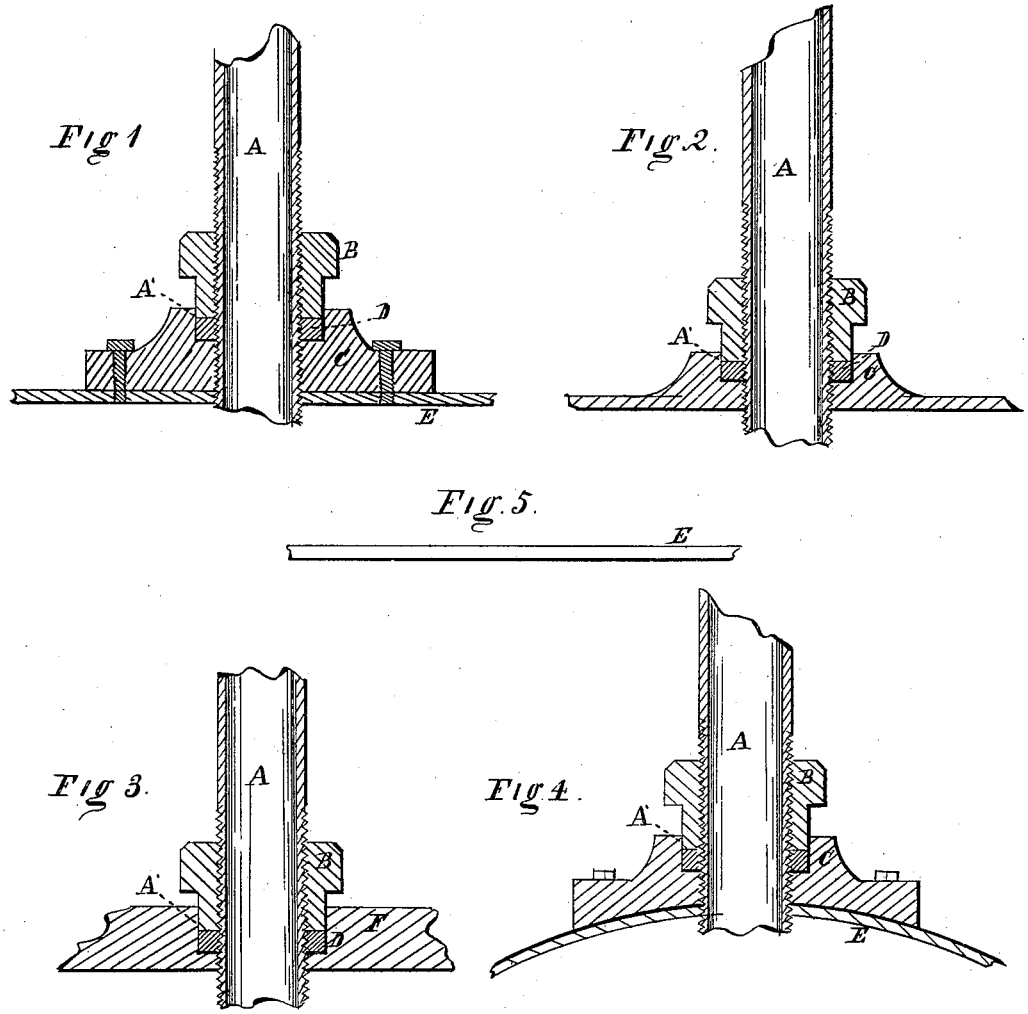
J. ENRIGHT.
Pipe Coupling or Joint.
No. 210,414. Patented Dec. 3, 1878.

UNITED STATES PATENT OFFICE.

JOHN ENRIGHT, OF CLEVELAND, OHIO.

IMPROVEMENT IN PIPE COUPLINGS OR JOINTS.

Specification forming part of Letters Patent No. 210,414, dated December 3, 1878; application filed September 30, 1878.

*To all whom it may concern:*

Be it known that I, JOHN ENRIGHT, of Cleveland, in the county of Cuyahoga and State of Ohio, have invented a certain new and Improved Pipe Coupling or Joint; and I do hereby declare that the following is a full, clear, and complete description thereof, reference being had to the accompanying drawings, making a part of the same.

The nature of this invention relates to a device for making a reliable and variously-adaptable pipe-joint, whereby gases and volatile liquids under pressure may be securely confined, and, furthermore, by means of which pipes can be tightly and readily attached to a reservoir, tank, boiler, or other vessel, and by which means sections of pipes may be securely connected to each other either in straight lines or at any angle or shape for which the ordinary pipe coupling or joint is employed. It also affords a convenient means of connecting two vessels or manifolds together with one length of pipe, thereby dispensing with the use of the union or right and left hand thread coupling usually employed for that purpose.

For a more full understanding of the invention and its adaptability to the several purposes specified, reference will be had to the annexed drawings, which represent various applications of the said improvement without changing the nature of the invention.

The coupling device above alluded to consists of a section of pipe, A, on the end of which is cut a thread adapted to fit the nut or gland B, into which it is screwed, as shown in the drawings, Figure 1. C is a flanged collar or boss, having a central opening, in which is cut a female screw corresponding to that in the nut or gland B alluded to. In the upper side of the flanged collar or boss around the opening is made a recess or countersink adapted to receive the gland. Said recess is partially filled with packing D, which may consist of any suitable material.

The practical application of the above-described device is as follows: In the event of a pipe being attached to a boiler or any vessel the metal of which is too thin, as seen in Fig. 5, to afford a strong and sufficient hold for the pipe on being screwed into it to secure a tight connection, the flanged collar or boss C is used. Said collar, as seen in Fig. 1, is bolted to the thin plate E of the vessel, in which is made and threaded a hole corresponding to that in the collar. The gland or nut B is run back upon the pipe far enough to allow the end thereof to screw into the collar and through to the inside of the vessel, as shown in Fig. 1. The gland is then screwed down into the collar upon the packing D, pressing it firmly around the pipe, which, together with the screw, makes a strong and gas-tight connection of the pipe with the vessel, substantially as shown in said Fig. 1.

It will be obvious from the above that a pipe can be firmly and tightly attached to a vessel constructed of thin plate metal. Should the metal be sufficiently thick, as seen at F in Fig. 3, the flanged collar is dispensed with, and instead a hole is made in the plate and countersink to receive the packing and gland. The inner part of the hole is threaded, and into it is screwed the end of the pipe. The gland is then screwed down upon the packing, crowding it around the pipe, thereby completing the connection of the pipe with the vessel. When the vessel or other article to which the pipe is to be attached is of cast metal, but too thin to admit of being countersunk for the packing and gland, and to which a flanged collar cannot be practically secured, a boss can be cast upon the plate for that purpose, as seen in Fig. 2.

The application of the coupling can be made on curved surfaces or plates, substantially as it is applied to flat or plain surfaces, as seen illustrated in Fig. 4. The attachment of the pipe to plain or curved surfaces can be made at any desirable angle by simply making one side of the flanged collar thicker than the other, as the angle required may demand. If a flanged collar is not used, the hole for the pipe and the countersink for the packing and gland can be bored at the required angle.

For connecting pipes to each other a slight modification is made in the flanged collar, which modification consists in dispensing with the flange and making the collar much thicker or longer, forming a collar in length about twice or more the thickness of the flanged one, as seen at G, Fig. 6, Plate 2. Each end of said collar is countersunk for the gland and packing, and a screw cut therein for the end of the pipe, which is screwed into the collar, the gland being screwed down upon the packing, as and for the purpose above described, in attaching the pipe to boiler, &c.

Pipes are usually connected to each other by a collar or union, into the ends of which, respectively, are screwed the pipes, no gland being used. When the contents of said pipes are under pressure, or if of a permeating material, the joints are liable to leak. Such leaks can be stopped only by the application of some kind of lute to the joint, making an unseemly and insecure connection.

In using the connecting device herein described, should the joint leak, it is easily and readily stopped by giving a turn to the nut or gland.

In the event of many pipes being coupled together in a straight line, a centrally-located pipe could not be taken out, if coupled in the ordinary way, without being cut out; and to replace it by another the new pipe must be in two parts, and provided with a right and left hand thread union for connecting the two inner ends of the pipe after the outer ends have been screwed into the collars at the side lengths of pipe, into the collar of one of which side lengths of pipe the end of one piece of the new pipe must be screwed at considerable length, and then backed partially out to attach it to the union for connecting the two inner ends. This backing out of the pipe loosens it, and the connection therefor is liable to leak. This trouble and leakage are avoided by using the gland-coupling above described, as an intermediate section of pipe can be removed without displacement of the other sections on either side of it; also, this coupling or joint affords a convenient means for connecting two vessels or two manifolds together without using a union or right and left hand thread coupling in the center of the connecting pipe or pipes, which are necessarily used in coupling in the ordinary way, and which requires a short tapering thread on the pipe, the taper being the only way of tightening the pipe in the manifold, which, on being screwed into one of them, must be partially backed out, that its inner end may be connected to the screw-union the same as above described in connecting lengths of straight pipes.

In my coupling no tapering thread is used; but a parallel one is cut on the end of the pipe, far enough to admit of its being screwed into the vessel or manifold about twice the distance necessary to secure a hold therein, in order to bring the pipe lengthwise between the two vessels or other objects to be coupled together. The pipe is then partially backed out from the one vessel, that the opposite end thereof may enter the hole in the other vessel, which, being countersunk for the gland or nut, is made tight therein by screwing down the gland upon the packing in the countersink, forming a permanent and tight joint.

It will be obvious from the above description of my invention and of its various applications that a flange does not necessarily form a part of the coupling device, it being simply an expansion of the collar or boss to adapt it to certain places or things; and also, that the collar, as a separate thing, is essential only in some cases, for when the metal of the object to which the pipe is to be attached is of sufficient thickness, the pipe-hole is made therein, threaded, and countersunk for the packing and gland, thereby dispensing with a collar.

Fig. 7, Plate 2, shows the application of the coupling or joint to a return-bend; and Fig. 8 represents a T-pipe provided in like manner with the coupling or joint.

From the above illustration will readily be seen the various adaptability of the coupling, and from which other applications of it will be easily inferred.

I am aware that heretofore, in the kind of couplings herein shown, a nut has been used for packing; but it never entered the recess for the packing, whereby the same may be successively and continuously packed. What distinguishes my improvement is the gland or follower inserted in the recess for the packing, arranged in relation to the pipe, box, or boss, to operate conjointly, as herein described.

What I claim as my invention, and desire to secure by Letters Patent, is—

In pipe couplings or joints, the gland provided with a female screw, whereby it is screwed upon the pipe, and said pipe being screwed into a flanged or unflanged collar or boss, in combination with said pipe, and the collar or boss having a recess or countersink adapted to receive said gland and packing, whereby the gland may follow up continuously the packing, when required, substantially as and for the purpose described.

JOHN ENRIGHT.

Witnesses:
 J. H. BURRIDGE,
 A. F. PARKER.